United States Patent [19]

Barthelemy

[11] 4,271,920
[45] Jun. 9, 1981

[54] AUTOMOBILE VEHICLE WITH TRANSVERSE ENGINE-DRIVE UNIT

[75] Inventor: André J. Barthélémy, Saint-Remy-les-Chevreuse, France

[73] Assignees: Societe Anonyme Automobiles Citroen; Automobiles Peugeot, both of Paris, France

[21] Appl. No.: 910,673

[22] Filed: May 30, 1978

[30] Foreign Application Priority Data

Jun. 3, 1977 [FR] France ................ 77 17101

[51] Int. Cl.³ ............................. B60K 5/04
[52] U.S. Cl. ....................... 180/55; 180/12; 180/54 F; 180/56; 180/297
[58] Field of Search ............ 180/54 F, 55, 56, 57, 180/58, 59, 60, 61, 62, 63, 11, 12, 64 R, 64 M, 42, 297, 292, 291; 248/634, 635; 267/140.5

[56] References Cited

U.S. PATENT DOCUMENTS

| | | | |
|---|---|---|---|
| 1,482,017 | 1/1924 | Leggett | 180/55 |
| 2,239,319 | 4/1941 | Halford et al. | 248/634 |
| 2,633,203 | 3/1953 | Paton | 180/299 X |
| 3,302,740 | 2/1967 | Giacosa | 180/292 |
| 3,490,901 | 3/1969 | Cauvin | 248/573 |
| 3,497,025 | 2/1970 | Rosenkrands | 180/56 |
| 3,894,604 | 7/1975 | Grosseau | 180/297 |

FOREIGN PATENT DOCUMENTS

1489232 6/1967 France.

Primary Examiner—John J. Love
Assistant Examiner—Milton L. Smith
Attorney, Agent, or Firm—Stevens, Davis, Miller & Mosher

[57] ABSTRACT

A mounting arrangement for a transversely mounted engine-drive unit in which the engine-drive unit is connected to a vehicle sub-frame by structure preventing longitudinal movement between the unit and the sub-frame while permitting limited vertical movement therebetween with the engine-drive unit carrying the driven axle while the non-driven axle is mounted on the sub-frame and a self-supporting body is resiliently connected to the sub-frame and to the engine-drive unit. The connecting structure also permits slight pivoting movements around a transverse axis.

2 Claims, 14 Drawing Figures

AUTOMOBILE VEHICLE WITH TRANSVERSE ENGINE-DRIVE UNIT

BACKGROUND OF THE INVENTION

1. Field of the Invention

The invention relates to automobile vehicles of the type which comprise a self-supporting body to which front and rear axles are elastically connected, as well as an engine-drive unit arranged transversally.

It is a particular object of the invention to render these automobile vehicles such that they respond to the various exigencies of practice better than hitherto and such that their body receives a minimum of vibration coming from mechanical parts (engine—transmission on the one hand and connection with the ground on the other hand) while ensuring good road stability with simple and uncumbersome means.

In accordance with that object, the invention relates to a mounting arrangement for a transversely mounted engine-drive unit in which the engine-drive unit is connected to a vehicle sub-frame by structure preventing longitudinal movement between the unit and the sub-frame while permitting limited vertical movement therebetween with the engine-drive unit carrying the driven axle while the non-driven axle is mounted on the sub-frame and a self-supporting body is resiliently connected to the sub-frame and to the engine-drive unit. The connecting structure also permits slight pivoting movements around a transverse axis.

GENERAL DESCRIPTION OF THE INVENTION

According to the invention, an automobile vehicle of the previously defined type, is characterized by the fact that the engine-drive unit is fast to the drive axle, and is connected, on the one hand, to a sub-frame fast to the nondrive axle through means adapted to prevent any relative longitudinal movement between the unit and the sub-frame while permitting slight pivoting movements around a transverse axis, and if necessary vertical movements, between said unit and sub-frame, and on the other hand, to the body through vibration absorbing devices.

Said means, preferably elastic, establishing a connection between the unit and the sub-frame, comprise, advantageously, at least one metallic strip situated in a substantially horizontal plane and connected along one of its transverse edges to the sub-frame, and along its other transverse edge to the engine-drive unit, said strip having a flexibility in the vertical direction.

The strip can extend over the whole width of the end of the sub-frame.

According to a modification, two connecting strips are provided between the unit and the sub-frame, situated in the same substantially horizontal plane, the two strips being respectively fixed to each lateral edge of the end of said sub-frame.

The connecting means may comprise at least one other strip, also horizontal, arranged so as to work in extension when the one or more preceding strips work in compression and conversely.

In practice, at least one strip is connected by its front transverse edge to the sub-frame and by its rear transverse edge to the unit, and at least one other strip is connected conversely through its rear transverse edge to the armature and through its front transverse edge to the unit.

The connecting means between the unit and the sub-frame may comprise at least one block of elastomeric material arranged between the end of the sub-frame and the unit and adapted to support the vertical forces between the unit and the sub-frame, for example during braking and acceleration of the vehicle, while permitting relative angular movement around the transverse axis.

According to another embodiment, the means establishing a connection between the unit and the sub-frame comprise at least one flexible sleeve transverse articulation whose flexibility is practically nil in the longitudinal direction, but possible in the vertical direction. Two articulations are generally provided, one on each side of the front end of the sub-frame.

Each articulation, preferably comprises a tab, fast to the unit, provided with a transverse housing adapted to receive the flexible sleeve, which is traversed by a rigid axle borne by a front end of the sub-frame. This end can form a cradle which receives the tab.

The vibration absorbing device, placed between the unit and the body, are arranged so as to permit slight longitudinal and vertical relative movement, according to the relative position of the vibration absorbing device with respect to the axis of inertia of the unit, and pivoting around a transverse axis between the unit and the body, and so as to transmit the static load from the body to the drive wheels, without significant reaction on the abovesaid elastic means.

The vibration absorbing devices are advantageously placed towards the upper part of the unit, close to a vertical transverse plane passing through the center of the drive wheels.

The vibration absorbing devices are, in addition, advantageously placed in proximity to the vertical transverse plane passing through the center of gravity of the unit, the flexibility of the vibration absorbing devices being then predominantly in the longitudinal direction.

The filtering elements can comprise sleeves of elastomeric material whose axis is oriented transversally.

According to a modification, the vibration absorbing devices are formed as blocks of elastomeric material working essentially in shear along the longitudinal direction.

The abovesaid sub-frame is situated beneath the body and can be formed either by a frame, or by a girder widened at its front and rear ends; it has great rigidity in its mean horizontal plane.

According to another embodiment, the abovesaid means adapted to prevent any relative longitudinal movement between the unit and sub-frame while permitting slight pivoting movements around the transverse axis and possibly vertical movements comprise at least one horizontal connecting rod, oriented substantially in the longitudinal direction, and articulated at its ends respectively, to the motor drive unit and to the sub-frame, the connecting rod being combined with at least one elastic connecting block between the body and the end of the sub-frame in the vicinity of the block, this elastic connecting block ensuring, for example, the holding of the sub-frame in alignment with the connecting rod.

Preferably, two connecting rods separated transversally from one another are provided; advantageously, these two connecting rods are arranged symmetrically with respect to the axial longitudinal plane of the vehicle.

Two elastic connecting blocks between the body and the end of the sub-frame in the vicinity of the unit are also provided and arranged symmetrically with respect to the longitudinal axial plane of the vehicle.

The sub-frame can include a central longitudinal part rigidly connected, at its end in the vicinity of the unit, to a part forming a transverse member and extending, from one side to the other, beyond the central part. The connecting rods are articulated to the transverse ends of said part forming a transverse member.

The elastic connecting blocks are, advantageously, situated substantially at the apices of the angle formed at the union of the outer contours of the transverse member and of the central part of the sub-frame.

BRIEF DESCRIPTION OF THE DRAWINGS

The invention consists, apart from the above-mentioned features, of certain other features which will be more explicitly considered below in the detailed description of particular embodiments given with reference to the accompanying drawings, but which is in no way limiting.

DESCRIPTION OF PREFERRED EMBODIMENTS

Figure 1:
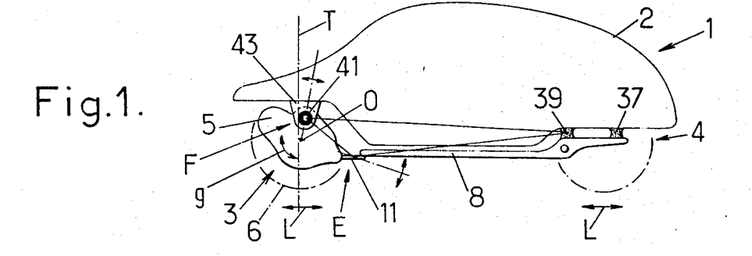
FIG. 1, of these drawings, is a diagram representing a vehicle according to the invention.
Figure 2:
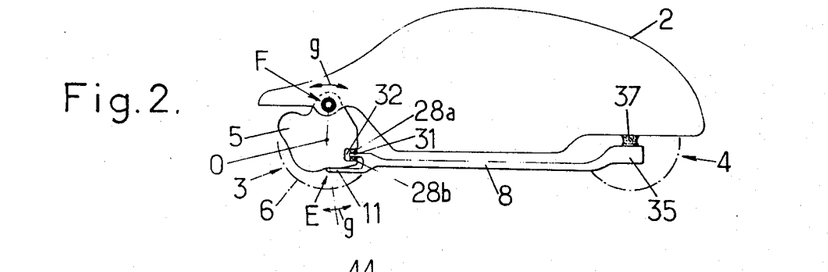
FIG. 2 is a diagram of one embodiment.
Figure 3:
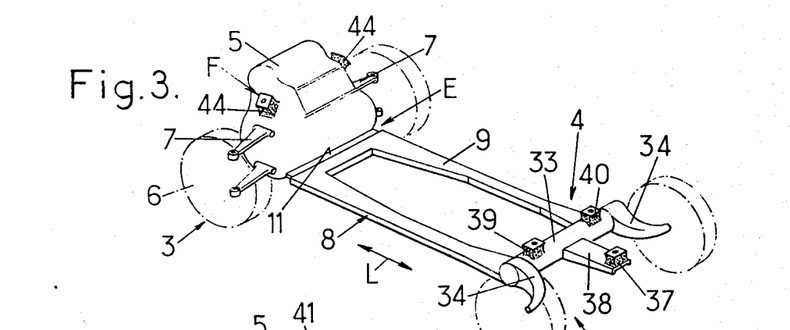
FIG. 3 is a diagrammatic view, in perspective, of an engine-drive unit, of the sub-frame and of the front and rear axles of a vehicle according to the invention.

Referring to the drawings, more particularly to FIGS. 1 to 4, there is shown a vehicle 1 with a self-supporting body 2, to which are elastically connected the front axle 3 and rear axle 4. The term "axle" is employed in a general sense to denote the assembly of the wheels of the same train, these wheels being suspendable independently. The engine drive unit 5, shown diagramatically (as well as the whole of the vehicle) is arranged transversely, as can be seen better in FIGS. 3 and 4, and is connected elastically to the body 2. In the example shown in the drawings, the unit 5 is connected to the front of the vehicle; the front axle 3 constitutes the drive axle. The unit 5 is fast to this drive axle 3; for example, as shown in FIG. 3, the front wheels 6 are borne by transverse arms 7 articulated directly to the casing of the unit 5 which constitutes, in this case, the front axle directly.

It is clear that the engine-drive unit 5 can be positioned at the rear of the vehicle; the description and explanations which follow are also valid for such an embodiment.

The engine-drive unit 5 is connected, on the one hand, to a sub-frame 8 fast to the non-driven axle. This axle is formed, in the example shown in the drawings, by the rear axle 4; the connection between the unit 5 and the sub-frame 8 is ensured by means E adapted to prevent any longitudinal relative movement (that is to say, in the direction L) between the unit 5 and the sub-frame 8, while permitting slight pivoting movements of the unit 5, with respect to the sub-frame 8, around the transverse inertial axis 0 and possibly vertical movements. The transverse axis of inertia 0 is a transverse axis (that is to say horizontal and perpendicular to the mean longitudinal vertical plane of the vehicle) passing through the center of gravity of the unit 5.

The sub-frame 8 is situated below the body 2 and is formed either by a frame 9, as shown in FIG. 3, or by a girder 10, shown in FIG. 4, widened at its front end 10a and at its rear end 10b. The sub-frame 8 possesses great rigidity in its mean horizontal plane so as to ensure a constant geometry between the two axles 3 and 4.

The means E comprise at least one flexible strip 11 situated in a substantially horizontal plane and connected along a transverse edge, the rear one, to the sub-frame 8 and along its other transverse edge, the front one, to the unit 5. The strip 11 is a metallic strip having a flexibility in the vertical direction. This strip 11 has a resistance to compressive forces and to tractive forces sufficient to prevent any appreciable relative longitudinal movement between the unit 5 and the sub-frame 8. Strip 11 can be formed of spring steel. Strip 11 can extend along the whole width of the end of the sub-frame 8, as shown in FIG. 3.

Figure 4:
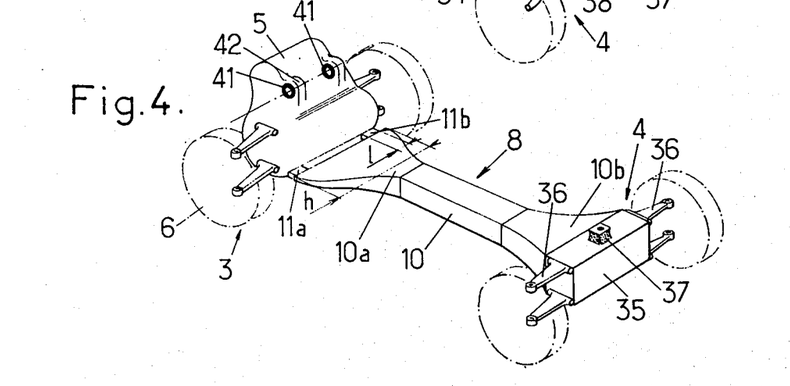
FIG. 4 shows, similarly to FIG. 3, a modification of one embodiment.

In a modification, shown in FIG. 4, two connecting strips 11a, 11b may be provided between the unit 5 and the sub-frame 8; these two strips are situated in the same substantially horizontal plane, and have a length 1 less than the transverse dimension h of the end of the sub-frame. The ratio 1/h is less than ¼. The two strips 11a, 11b, are fixed close to each lateral edge of the end of the sub-frame; in the embodiment of FIG. 4, it is the widened end 10a, but it is clear that the two strips 11a, 11b, could be provided at the end of the frame 9 of FIG. 3.

Figure 5:
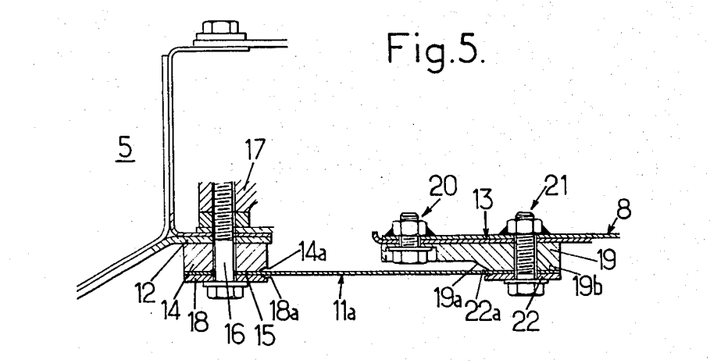
FIG. 5 is a partial longitudinal section, at the level of the connecting strip between the unit and the sub-frame.

The fixing of the strips 11 or 11a, 11b, along their transverse edges, can be effected as shown in FIG. 5 for the case of a strip such as 11a. The strip is situated below horizontal transverse walls 12, 13, respectively, fast to the unit and to the sub-frame 8. The front transverse edge 15 of the strip 11a, neighboring the unit, is fastened beneath the lower surface of a part 14 by screws 16 with a vertical axis passing through the strip 11a, the part 14, and the part 12. The screws 16 are threaded into threaded holes of a part 17 fast to the unit 5. A plate (or support plate) 18 is provided between the head of the screw 16 and the strip 11a. The lower transverse edge 14a, situated at the rear of the part 14 is beveled, in the same way as the rear zone 18a of the plate so that the strip 11a can undergo flexing deformation without being damaged by a sharp edge.

On the side of the end of the sub-frame 8, a support part 19 fixed below the part 13 is also provided and secured by an assembly of bolts and nuts 20. The part 19 includes, towards its rear portion, a thickening. The rear transverse edge of the strip 11a is locked against the lower surface 19b of this thickening by an assembly 21 of vertical screws and nuts; the screws pass through holes provided in the rear edge of the strip 11a, into the plate 19, and into the part 13. The plate 22, similar to the washer 18 is provided between the screw heads and the lower surface of the strip 11a. An inclined connecting zone 19a, of beveled shape, provides a transition between the less thick front part, of the part 19 and the thickening situated at the rear. Plate 22 has at its upper front end a beveled zone 22 situated substantially at the same level in the longitudinal direction as the part 19a; these two zones 19a, 22a play a role similar to that of the zones 14a, 18a.

There is also advantageously provided, at least one other strip 11c (FIGS. 7 and 9), also horizontal, adapted to work in extension or traction when the one or more strips 11, 11a or 11b mentioned previously work in compression and conversely.

It has been seen that the strip 11a (or 11 or 11b) has its front edge 15 fast to the engine-drive unit and its rear edge fast to the sub-frame 8.

On the other hand, the strip 11c has its front transverse edge 24 made fast to the end of the sub-frame 8 while its rear transverse edge 25 is fast to the unit 5. For this, a connecting tab 26, situated above the strip 11c, is fixed to the end of the sub-frame 8 and projects forwards up to the edge 24 which is fixed by screws and nuts to this tab 26. A lower tab 27 is provided below the strip 11c; the front end 27a of the tab 27 is fixed by screws and nuts, to a part 17 fast to the unit 5; the rear edge 25 of the strip 11c is fixed to the rear part 27b of the tab 27 by weld spots 23. The rear part of the tab 26 is also fixed by weld spots 23 to the front end of the sub-frame 8.

Figure 7:
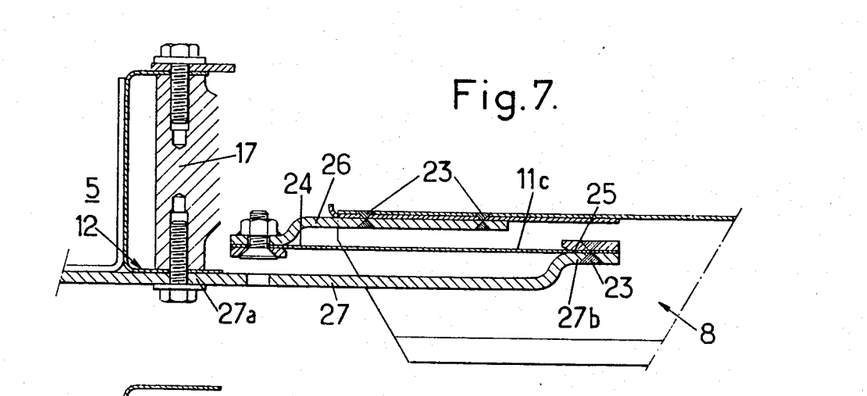
FIG. 7 is a section along the line VII—VII of FIG. 9.

As seen in FIG. 7, the tabs 26, 27 are bent at their ends so that their mean plane is separated from the strip 11c to enable the latter to undergo vertical flexing deformations.

Figure 8:
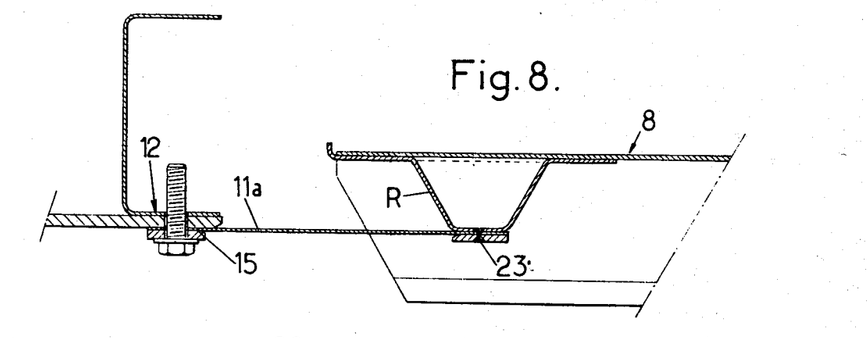
FIG. 8 is a section along the line VIII—VIII of FIG. 9.

In the embodiment of FIGS. 7 and 8, the intermediate parts 14 and 19, appearing in FIG. 5 have been eliminated. THe rear edge of the strip 11a, as visible in FIG. 8, is fixed by weld spots 23 to a protuberance R, extending downwardly, from the upper level of the front end of the sub-frame 8.

Figure 9:
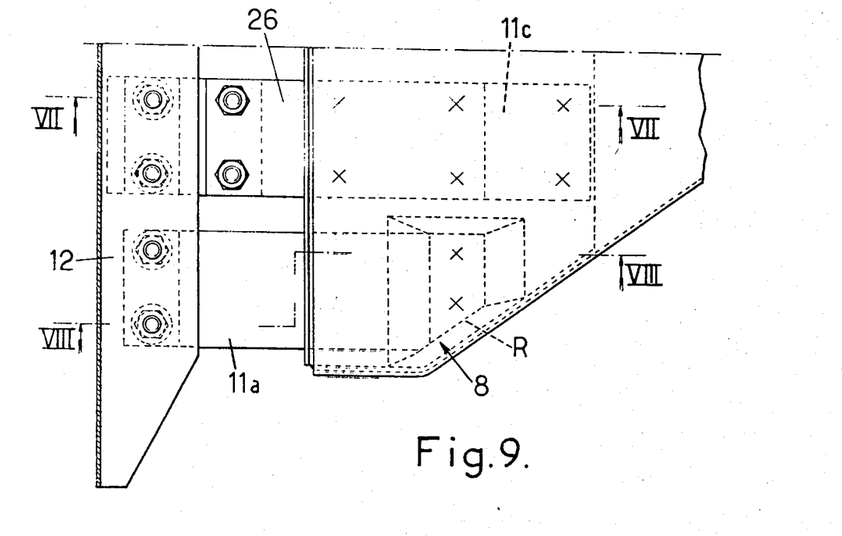
FIG. 9 is a plan view, of an assembly with two connecting strips, of which one works in extension when the other works in compression and reciprocally.

The strip 11c and 11a are advantageously situated in the same plane. The strip 11c, as seen in FIG. 9, is situated in the transverse direction, inwardly with respect to the strip 11a. There are preferably provided two strips such as 11c combined with two strips such as 11a and 11b.

Figure 6:
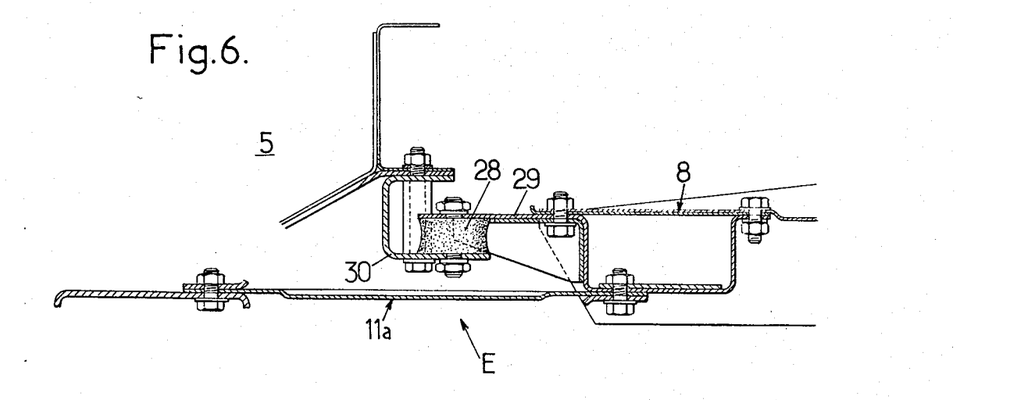
FIG. 6 is a partial longitudinal section of a modification in which a connecting strip is combined with a block of elastomeric material.

As shown in FIG. 6, the connecting means E between the sub-frame and the unit can include a block of elastomeric material 28, in the form of a sleeve with a vertical axis, arranged between a horizontal extension 29 of the end of the sub-frame, situated above the block 28, and a horizontal part 30 fast to the unit 5, and situated below the block 28. Threaded metal parts separately anchored in the block 28, enable the fixing of this block, in conventional manner. The part 30 may be constituted by a lower horizontal wing of a U-shaped sectional element fixed to the rear of the unit 5.

The block 28 is dimensioned to absorb the vertical forces between the unit 5 and the sub-frame 8, for example on braking and acceleration of the vehicle, while permitting relative angular movements around the transverse axis 0 (FIG. 1).

In FIG. 2, is shown diagrammatically a modification of the block of elastomeric material forming part of the connecting means between the unit 5 and the sub-frame 8. This block comprises two parts 28a, 28b, arranged between an extension 31 of the sub-frame 8 and stop surfaces provided on the unit 5 formed by the walls of a housing 32, provided in the unit 5 to receive the end of the extension 31. Whatever the direction of pivoting of the unit 5 around the axis 0, there is always a block 28a or 28b which works in compression.

The flexible strip 11, in the case of FIG. 2, is situated on the lower part of the sub-frame 8, below the extension 31 and is connected to the lower part of the unit 5.

The non-driven axle 4 is rigidly fast to the sub-frame 8 as shown in FIGS. 3 and 4. In the embodiment of FIG. 3, the non-driven axle comprises a rigid tubular cross-member 33 forming the rear part of the frame 9. The rear wheels are borne by longitudinal arms 34 articulated to the ends of the cross-member 33.

In the embodiment of FIG. 4, the rear axle is formed by the rear part 35 of the beam 10, arranged in the form of a cross-member with a rectangular section, and of high rigidity. The rear wheels are borne by transverse arms 36 articulated to the two ends of the cross-member 35.

The axle 4 is connected to the body 2 through at least one block 37 (FIG. 4) of elastomeric material arranged on the axis support rear cross-member 35 in line with or in the vicinity of the vertical plane passing through the center of the non-drive wheels. A single block 37 can suffice if the sub-frame 8 possesses suitable high rigidity in torsion around a longitudinal axis, which is the case particularly for the embodiment of FIG. 4.

In the embodiment of FIG. 3, the block of elastomeric material 37, situated in the middle vertical longitudinal plane of the vehicle is borne by a rigid arm 38 oriented in the longitudinal direction toward the rear of the vehicle, fast to the cross-member 33, and situated in the middle part of this cross-member.

Two other blocks of elastomeric material 39, 40, offset in the longitudinal direction with respect to the block 37 are provided in the embodiment of FIG. 3 so as to reduce the forces transmitted to the block 37, in particular on braking. The blocks 39 and 40 are advantageously provided at the front of the block 37, on the cross-member 33, in the vicinity of the end of this cross-member, so that the fixing points of the blocks 37, 39 and 40 to the body and to the sub-frame are distributed at the summit of a triangle; the blocks 39 and 40 are advantageously symmetrical with respect to the longitudinal axis of the vehicle.

The diagrammatic view in elevation of FIG. 1 corresponds to a fastening of the rear axle 4 to the body 2 of the type in FIG. 3, while the view in elevation of FIG. 2 corresponds to a fastening of the rear axle to the body of the type in FIG. 4.

The unit 5 is connected, on the other hand, to the body 2 through vibration absorbing devices F adapted to resist the transmission of vibration between the unit 5 and the body 2.

These vibration absorbing devices F are arranged so as to permit slight longitudinal and vertical movements between unit 5 and body 2, according to the relative position of the vibration absorbing devices with respect to the transverse inertial axis 0 of the unit 5, and slight pivoting movements around this transverse axis 0. The vibration absorbing devices are arranged, also, so as to transmit the static load from the body 2 to the drive wheels, without significant reaction on the connecting means E between the unit 5 and the sub-frame 8.

The vibration absorbing devices F are placed towards the upper part of the unit 5, as shown in FIGS. 1 to 4 and close to (that is to say at a distance of the order of some centimeters or less) the vertical transverse plane T passing through the center of the drive wheels 6. Through this fact, the reaction of the load of the body 2 on the means E is slight.

In addition, the vibration absorbing devices F are situated close to the vertical transverse plane passing through the transverse inertial axis 0. The flexibility of the vibration absorbing devices F is then predominantly in the longitudinal direction L to enable slight pivoting movements around the axis 0.

These devices F may be constituted by sleeves of elastomeric material 41 (FIGS. 1, 2 and 4) having a transverse axis. As can be seen more easily in FIG. 4, two sleeves 41 are generally provided in the vicinity of the lateral edges of the unit 5; these two sleeves 41 have the same axis and are arranged in cylindrical housings provided on the unit 5, and bounded by lugs 42. The connection to the body 2 is ensured by an axle or metal bolt passing through the inner central opening of the sleeve 41 and fixed to the body 2, for example, to tabs 43 (FIG. 1) fixed to this body.

The predominant flexibility of the sleeves 41 in the longitudinal direction can be ensured by providing cavities, in the sleeves 41, situated in the vicinity of the longitudinal plane passing through the axis of the sleeve.

In the embodiment of FIG. 3, the vibration absorbing devices F are constituted by blocks 44 (parallele pipedic with a rectangular section) of elastomeric material ensuring the connection between unit 5 and the body 2 and arranged so as to work principally in shear in the longitudinal direction L. Two blocks are shown in FIG. 3, fixed to the lateral edges and to the upper part of the unit 5.

Figure 10:
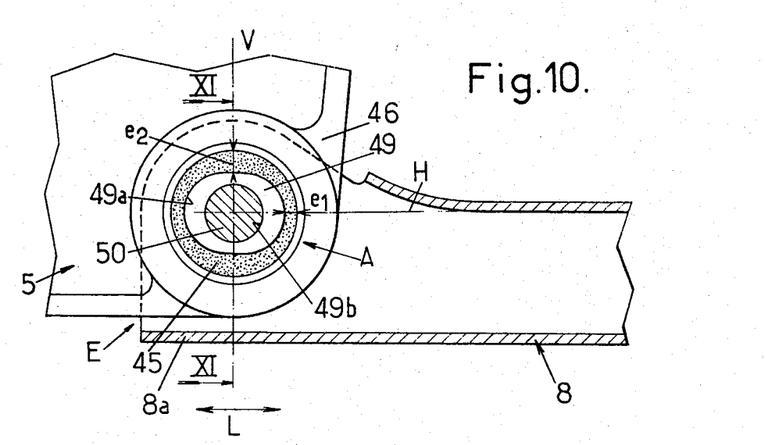
FIG. 10 is a partial view in elevation, with parts in section, of elastic connecting means constituted by a transverse articulation.
Figure 11:
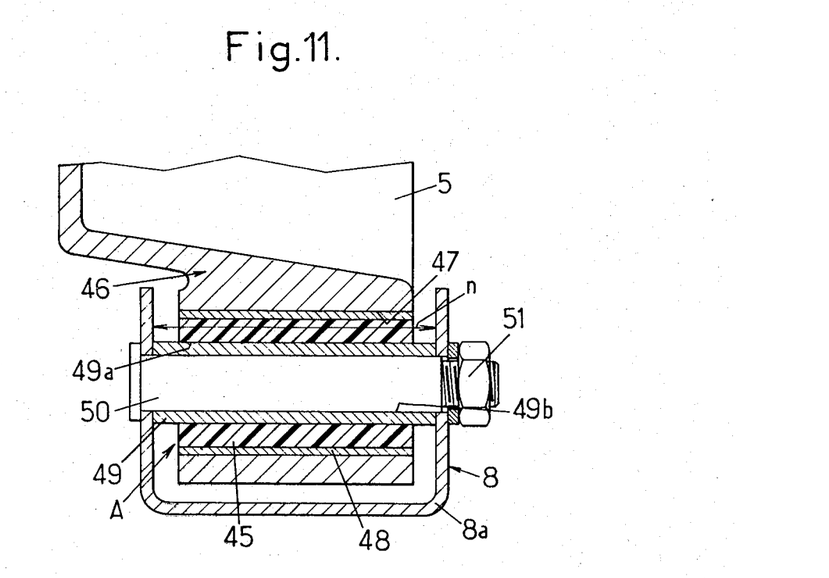
FIG. 11 is a section along the line XI—XI of FIG. 10.

FIGS. 10 and 11 show another embodiment of means E forming a connection between the unit 5 and the sub-frame 8. The rear lower end of the casing of the unit 5 and the front end of the armature 8 only have been shown.

The means E comprise two articulations A, one articulation being provided on each side of the front end of the sub-frame 8, between this sub-frame and the unit.

Each articulation A comprises a slightly flexible sleeve 45, of elastomeric material, with practically zero flexibility in the longitudinal direction and substantial flexibility in the vertical direction. To ensure these differences in flexibility, the sleeve 45 is given, on the one hand, a slight thickness $e_1$ (FIG. 10) in the horizontal plane H passing through the axis of the sleeve whence a practically zero flexibility in the direction L, and on the other hand, a greater thickness $e_2$ (FIG. 10) in the vertical plane V passing through the axis of the sleeve, whence substantial flexibility in the vertical direction. Cavities (not shown) may be provided in the sleeve 45 close to the plane V, in its thickest part, to increase the flexibility in the vertical direction. By way of non-limiting example, it may be indicated that $e_2 \leqq 2 e_1$.

A tab 46 (FIG. 11) fast to the casing of the unit 5 is provided with a transverse housing 47, with a circular section, designed to receive the sleeve 45. A metal bush 48 surrounds the sleeve 45 which is bonded to the inner surface of this bush 48. The bush 48 is slipped with the sleeve 45 into the housing 47.

A tubular part 49 passes through the inner opening of the sleeve 45 which is also bonded, on its inner surface, to the part 49. The outer transverse contour 49a of this part 49 has a flattened elliptical shape, whose large axis is oriented in the direction L, as can be seen from FIG. 10, by reason of the different thicknesses $e_1$, $e_2$, of the sleeve. The inner transverse contour 49b of the part 49 is circular and defines a housing traversed by a rigid axle 50 borne by the sub-frame 8.

The front end of the sub-frame 8 forms, as can be seen in FIG. 11, a type of cradle 8a with a U-shape transverse section, adapted to receive in its concavity, the end of the tab 46. The wings of the U include holes for the passage of the axle 50. The axle 50 is formed by a bolt whose head, situated to the left in FIG. 11, is in abutment against one wing of the U and whose threaded end, situated to the right in FIG. 11, receives a nut 51 supported against the outer surface of the other wing of the U. The part 49 has a length equal to the distance n between the inner surfaces of the wings of the end 8a. This part 49 serves as a cross-piece and is locked, in rotation, on tightening of the nut 51.

It is clear that the articulations A, constituting means E equivalent to the elastic strips 11, 11a, 11b, 11c, will be used, like these strips, in combination with the vibration absorbing devices F or other parts already described.

This being the case, the behavior of the vehicle according to the invention is as follows.

The engine-drive unit 5, with an internal combustion engine arranged transversally, generated variations in torque, on each cycle of combustion, around a transverse axis with respect to the vehicle, passing substantially through the center of gravity of the unit 5. The vibration absorbing device F, which permit slight longitudinal movements, combined with elastic means formed by the strips 11, ... 11c, or the articulations A, will permit slight oscillations of the unit 5, around the transverse axis 0 in response to these variations in torque. These oscillations around the axis 0 are shown diagrammatically in FIGS. 1 and 2, by arrows in the form of a circular arc such as g.

This possibility of oscillation of the unit 5 around the axis 0 attenuates the transmission to the other parts of the vehicle, particularly to the body, of the vibrations due to the variations in torque.

This slight mobility of the unit 5 and hence of the axle 3 fast to the unit 5, around the transverse axis 0 permits, in addition, slight longitudinal movements of the body 2 with respect to the axles 3 and 4, on the one hand, by longitudinal flexibility of the vibration absorbing devices F and of the connecting blocks 37, 39, 40, on the other hand, by the deformation of the triangle (shown in fine lines in FIG. 1) having as apexes the connecting unit 5/body 2, unit 5/sub-frame 8 and body 2/non-driven axle 4. The deformation of this triangle is possible due to the flexibility of the means E (strips 11, 11a, 11b, blocks 28 and sleeves 45) and to the possiblity of oscillation of the unit 5 around the axis 0.

The vehicle has good road stability due to the maintenance of parallelism of the axles 3 and 4; in fact, the combination of the sub-frame 8 and of the means E, preventing any relative longitudinal movement between the lower part of the unit 5 (hence the axle 3) and the sub-frame 8, ensures the maintenance of the parallelism of the axles.

In the vehicle according to the invention, an optimal absorption is ensured for the rolling vibrations (noise).

These vibrations are due essentially to the longitudinal impacts of the wheels on the road surface. Due to the high inertia in a longitudinal direction of the axle 3- unit 5 - sub-frame 8 - axle 4 assembly and to the possibility of slight longitudinal movements of this assembly with respect to the body 2, these vibrations are absorbed to the maximum.

The fastening of the engine-drive unit 5, when it is situated in the front and the steering axle 3 enables very accurate steering to be achieved by reason of the immediate response to any change in direction of the vehicle.

The sub-frame 8 formed by the frame 9 or the beam 10 can be thin (small size in the vertical direction) since it must present, essentially, high rigidity in the horizontal plane; the vertical forces, particularly the weight of the passengers, are essentially supported by the self-supporting body 2 and transmitted to the wheels through the elastic elements 37, 39, 40, 41 in line with the axles, without causing notable flexing stresses on the sub-frame 8. Through this fact, the floor of the vehicle can be situated at a very low level, which permits the construction of a vehicle of low height.

The number of elastic connections between the body 2 and the mechanical parts is reduced since the vibration absorbing devices F combine several functions. Hence optimal absorption of the vibrations with simple means is ensured.

Figure 12:
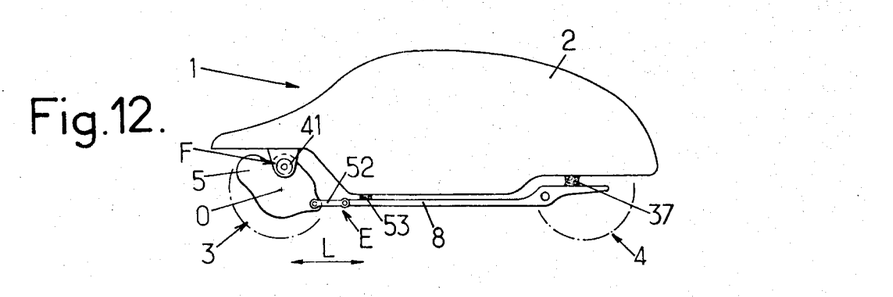
FIG. 12 is a diagram representing another embodiment of a vehicle according to the invention.
Figure 13:
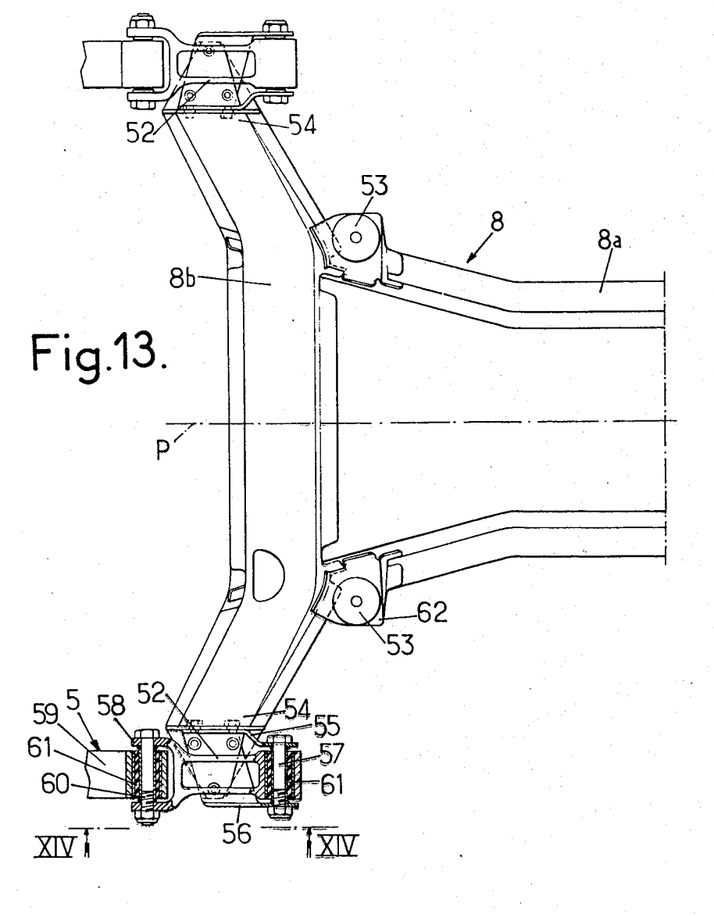
FIG. 13 is a plan view of the front end of the sub-frame of a vehicle constructed according to FIG. 12.
Figure 14:
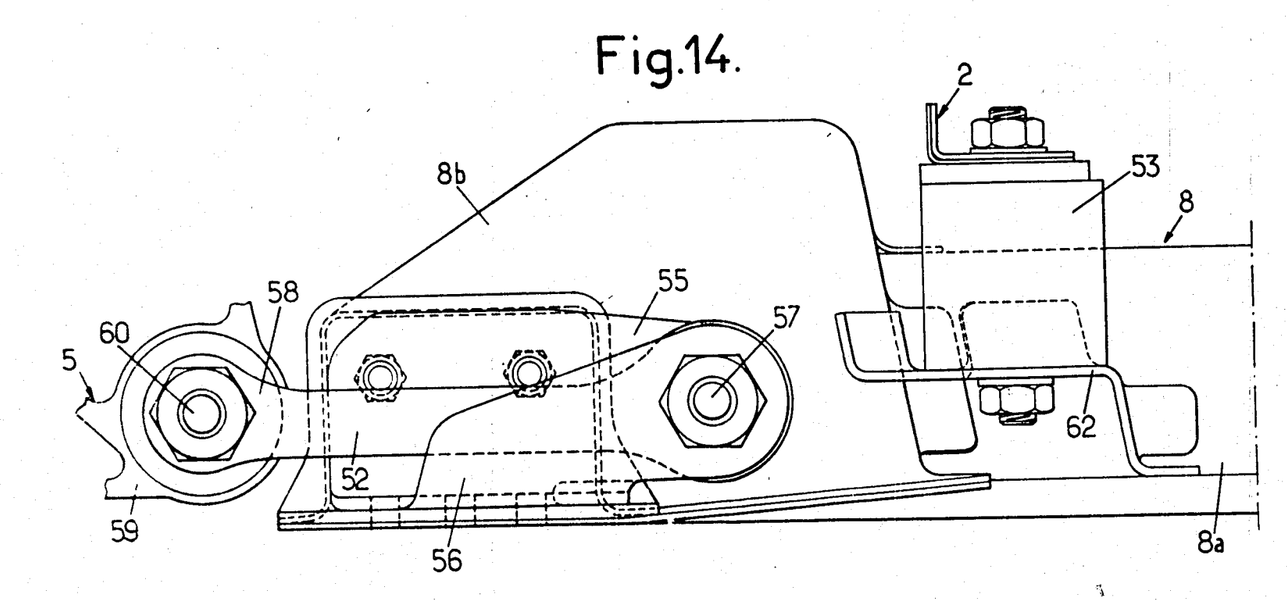
FIG. 14, lastly, is a view on a larger scale along the line XIV—XIV of FIG. 13.

Referring now to FIGS. 12 to 14, another embodiment can be seen. The majority of the elements identical with or playing similar roles to elements already described are denoted by the same reference numerals, and their description will not therefore be repeated.

The axle 4, or the sub-frame 8, is connected to the body 2 by at least one block 37 of elastomeric material.

The means E comprise two horizontal connecting rods 52, oriented in the longitudinal direction L, and arranged symmetrically with respect to the longitudinal axial plane P of the vehicle (FIG. 13).

Each connecting rod 52 is articulated, at its ends, respectively to the engine-drive unit and to the sub-frame 8.

The connecting rods 52 are combined with at least one and preferably two elastic connecting blocks 53 between the body 2 and the end of the sub-frame 8 neighboring the unit 5.

In the embodiment shown in the drawings, it is the front end of the sub-frame 8 since the engine-drive unit 5 is situated in the front. An arrangement with the unit 5 in the rear is possible in which case the connecting rods 52 would be articulated on the rear end of the sub-frame 8 and the block 53 would be provided between the body 2 and the rear end of the sub-frame.

The two connecting blocks 53 are also arranged symmetrically with respect to the plane P.

As seen in FIG. 13, the sub-frame includes a central longitudinal part 8a, forming a beam, rigidly connected, at its front end, to a part 8b forming a cross-piece and extending, from one side to the other, beyond the central part 8a.

The connecting rods 52 are articulated to the transverse ends 54 of the part 8b. On each end 54 are fixed two tabs 55, 56, extending towards the rear, between which tabs is housed the rear end of the connecting rod 52. These tabs 55, 56 carry a bolt 57 serving as an articulation axle for the connecting rod 52.

The front part of the connecting rod 52 forms a fork 58 which encloses a boss 59 fast to the unit 5. A bolt 60 serving as an articulation axle passes through the two arms of the fork 58 and a bore provided in the boss 59.

A sleeve of elastomeric material 61 surrounds each axle 57, 60, in the zone which traverses the bore of the articulation.

This sleeve 61 is designed to absorb the vibrations; it is arranged so as not to introduce substantial elasticity in the longitudinal direction L so that no substantial longitudinal movement is produced between the unit and the sub-frame.

The elastic connecting blocks 53 are situated substantially at the apices of the angles formed at the union of the outer contours of the cross-piece 8b and of the central part 8a; these angles are situated on the rear side of the cross-piece 8b.

The front end of the central part 8a can include parts 62 of sheet metal inserted and welded not only on the central part 8a but also on the cross-piece 8b so as to produce a fully rigid assembly. The lower ends of the elastic blocks 53 are fixed to these parts 62.

The blocks 53, of elastomeric material, are of the type denoted by 28 in FIG. 6.

The behavior of a vehicle conforming to FIGS. 12 to 14 is similar to that of a vehicle conforming to the embodiments of FIGS. 1 to 11.

The elastic connecting blocks 53 ensure the holding of the sub-frame, for example on braking in forward or reverse driving, in alignment with the connecting rods 52, in the longitudinal direction.

These blocks 53 work both in extension, and in compression, along the vertical.

The connecting rods 52 combined with these blocks 53 prevent therefore any longitudinal relative movement between the unit 5 and the sub-frame 8 while permitting slight pivoting movement around the axis 0, and possibly vertical, due to the articulations of the ends of said connecting rods 52.

In addition, there is no substantial transmission of vibrations to the body 2 while a relative freedom of longitudinal movement is permitted between the body 2 and the axles 3 and 4 due to the connecting blocks 37, 41 and 53.

We claim:

1. Automobile vehicle comprising a self-supporting body to which are connected elastically the front and rear axles including a driving axle, as well as an engine-drive transmission unit arranged transversally, said engine-drive unit being fastened to the driving axle, a longitudinal sub-frame fastened to the non-driving axle, said sub-frame being rigid in its mean horizontal plane to maintain a constant geometry between the front and rear axles, said engine-drive unit being connected, on the one hand, with said sub-frame by means adapted to prevent any relative longitudinal movement between the unit and the sub-frame while permitting slight pivoting movements around a transverse axis and possibly vertical movements, between the unit and the sub-frame, and, on the other hand, with the body by resilient connecting devices, the means connecting the unit to the sub-frame comprise at least one flexible sleeve transverse articulation whose flexibility is practically nil in the longitudinal direction but possible in the vertical direction, two articulations being provided, namely, one on each side of the sub-frame.

2. Vehicle according to claim 1, wherein each articulation comprises a tab fast to the unit, provided with a transverse housing adapted to receive the flexible sleeve part traversed by a rigid axle borne by the sub-frame, said sub-frame forming a cradle adapted to receive the tab and to support the rigid axle.

* * * * *